United States Patent
Yuan et al.

(10) Patent No.: US 11,223,769 B2
(45) Date of Patent: Jan. 11, 2022

(54) METHOD, DEVICE, CAMERA AND SOFTWARE FOR PERFORMING ELECTRONIC IMAGE STABILIZATION OF A HIGH DYNAMIC RANGE IMAGE

(71) Applicant: Axis AB, Lund (SE)

(72) Inventors: Song Yuan, Lund (SE); Johan Förberg, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/203,828

(22) Filed: Mar. 17, 2021

(65) Prior Publication Data

US 2021/0337101 A1    Oct. 28, 2021

(30) Foreign Application Priority Data

Apr. 22, 2020    (EP) .................................... 20170780

(51) Int. Cl.
*H04N 5/232*    (2006.01)

(52) U.S. Cl.
CPC ....... *H04N 5/2329* (2013.01); *H04N 5/23254* (2013.01); *H04N 5/23258* (2013.01); *H04N 5/23287* (2013.01)

(58) Field of Classification Search
CPC ............. H04N 5/2329; H04N 5/23254; H04N 5/23258; H04N 5/23287
USPC .................................................. 348/208.99
See application file for complete search history.

(56) References Cited

U.S. PATENT DOCUMENTS

| | | | | |
|---|---|---|---|---|
| 7,932,925 | B2* | 4/2011 | Inbar | G02B 27/646 |
| | | | | 348/208.2 |
| 9,413,962 | B2* | 8/2016 | Tsubaki | H04N 5/23267 |
| 10,325,345 | B2* | 6/2019 | Kitashou | G06T 3/00 |
| 10,666,941 | B1* | 5/2020 | Doron | H04L 65/607 |
| 10,728,474 | B2* | 7/2020 | Douady | G06T 7/85 |
| 10,853,927 | B2* | 12/2020 | Smirnov | G06T 5/002 |
| 10,880,455 | B2* | 12/2020 | Wu | G06T 5/003 |
| 10,924,674 | B2* | 2/2021 | Enke | G02B 27/646 |

(Continued)

FOREIGN PATENT DOCUMENTS

| | | |
|---|---|---|
| EP | 3716608 A1 | 9/2020 |
| WO | 2019/156308 A1 | 8/2019 |

OTHER PUBLICATIONS

Extended European Search Report dated Oct. 28, 2020 for European Patent Application No. 20170780.9.

(Continued)

*Primary Examiner* — Pritham D Prabhakher
(74) *Attorney, Agent, or Firm* — Volpe Koenig

(57) ABSTRACT

A system and method for electronic image stabilization for a high dynamic range image captured by a rolling shutter image sensor and more specifically to an algorithm configured to perform electronic image stabilization on the high dynamic range image, by, for each specific block of pixels among the blocks of pixels in the high dynamic range image, the specific block of pixels spatially corresponding to a pixel region of the rolling shutter image sensor, determining whether the specific block of pixels is copied from pixel data of the first image or the second image, or is a blend of pixel data from both the first image and the second image, and use motion data measured when capturing the first and second images for performing electronic image stabilization based on the origin of the specific block of pixels.

12 Claims, 4 Drawing Sheets

(56) References Cited

U.S. PATENT DOCUMENTS

| | | |
|---|---|---|
| 2009/0202176 A1 | 8/2009 | Hwang et al. |
| 2010/0271498 A1 | 10/2010 | Hwang et al. |
| 2012/0002082 A1 | 1/2012 | Johnson et al. |
| 2013/0100314 A1 | 4/2013 | Li et al. |
| 2013/0329087 A1 | 12/2013 | Tico et al. |
| 2015/0029349 A1 | 1/2015 | Ben Israel et al. |
| 2015/0085149 A1* | 3/2015 | Tsubaki ............... H04N 5/2628 348/208.4 |
| 2016/0182798 A1 | 6/2016 | Thorn et al. |
| 2017/0347044 A1* | 11/2017 | Douady-Pleven ........ G06T 7/00 |
| 2019/0058811 A1* | 2/2019 | Douady-Pleven ... H04N 1/3876 |
| 2019/0297283 A1 | 9/2019 | Douady et al. |
| 2020/0314289 A1* | 10/2020 | Wu ........................ H04N 5/365 |
| 2020/0334787 A1* | 10/2020 | Smirnov ............... G06T 3/4007 |

OTHER PUBLICATIONS

R. Dasari and C. W. Chen, "A joint visual-inertial image registration for mobile HDR imaging," 2016 Visual Communications and Image Processing (VCIP), Chengdu, China, 2016, pp. 1-4.
Communication pursuant to Article 94(3) EPC dated Mar. 25, 2021 for European Patent Application No. 20170780.9.

* cited by examiner

METHOD, DEVICE, CAMERA AND SOFTWARE FOR PERFORMING ELECTRONIC IMAGE STABILIZATION OF A HIGH DYNAMIC RANGE IMAGE

TECHNICAL FIELD

The present invention relates generally to an algorithm for electronic image stabilization, EIS for a high dynamic range, HDR, image captured by a rolling shutter image sensor.

BACKGROUND

Various kinds of electronic devices, e.g., smartphones, tablet computers, or digital cameras, may be equipped with increasingly sophisticated imaging functionalities. Such imaging functionalities for example include capturing of HDR still images or videos. Here, the term "HDR" means a multi exposure technique for reproducing a greater dynamic range of luminosity than what is possible with standard digital imaging or photographic techniques. An HDR image may also be referred to as wide dynamic range (WDR) image.

When capturing an image, a CMOS image sensor may be used. A CMOS image sensor may bring advantages such as a lower price, increased sensitivity, a higher resolution, etc. Many CMOS image sensors employ a rolling shutter technology. Rolling shutter is a technical term referring to the way the image sensor scans the image. A rolling shutter image sensor scans the image sequentially, from one side of the sensor (usually the top) to the other, line by line.

When it comes to performing electronic image stabilization (EIS) in combination with multi-exposure merge HDR imaging, there are two main possibilities:
1. stabilize each exposure individually before the exposure merge step.
2. stabilize the already-merged exposures together after the merge step.

Of these, the method (1) will generally result in higher quality stabilization. Since the exposures are separate in time, motion of the image sensor (e.g. rolling shutter image sensor) during one exposure will not match those in another. Using method (1), each exposure can be stabilized correctly before they are merged into the HDR image.

However, method (1) comes with a price in increased bandwidth requirements. The at least two exposures need to remain separate for a longer time (through the EIS step) before they can be merged. This typically means that a larger part of the imaging pipeline needs to run twice, once per exposure, instead of only once, on the merged image. For example, the separate exposures need to be stored in accessible memory until EIS is performed on both the image. Moreover, the required processing power for achieving the HDR image is increased, since the EIS is performed on each exposure.

The alternative method (2) is more efficient in terms of bandwidth, but since the exposures are already merged when EIS is performed, it is difficult to perform a fully correct EIS in the prior art. This results in a reduced image quality of the HDR image.

There is thus a need for improvements in this context.

SUMMARY

In view of the above, solving or at least reducing one or several of the drawbacks discussed above would be beneficial, as set forth in the attached independent patent claims.

According to a first aspect there is provided a method of performing electronic image stabilization, EIS, of a high dynamic range, HDR, image, depicting a scene, the method comprising:
  receiving a first image and a second image depicting the scene, the first and second image captured by a rolling shutter image sensor comprising a plurality of pixel regions, wherein the rolling shutter image sensor during capture of an image reads out pixel data from one pixel region at a time, the first and second image captured with different exposure times,
  receiving first and second motion data, each indicating a plurality of poses of the rolling shutter image sensor when capturing the first and second image, respectively, wherein each pose corresponding to a pixel region of the rolling shutter image sensor and indicates an orientation and/or position of the rolling shutter image sensor determined during read-out of pixel data of the pixel region,
  creating the HDR image by merging the first and second images,
  performing EIS on the HDR image, by, for each specific block of pixels among the blocks of pixels in the HDR image, the specific block of pixels spatially corresponding to a pixel region of the rolling shutter image sensor:
    determining whether the specific block of pixels is copied from pixel data of the first image or the second image, or is a blend of pixel data from both the first image and the second image,
    wherein, upon determining that the specific block of pixels is copied from pixel data of the first image, EIS is performed on the specific block of pixels by using the pose of the corresponding pixel region of the first motion data,
    wherein, upon determining that the specific block of pixels is copied from pixel data of the second image, EIS is performed on the specific block of pixels by using the pose of the corresponding pixel region of the second motion data.

A rolling shutter image sensor is a sensor which does not capture an image of a scene at a single instance in time but instead scans across the scene, normally either vertically or horizontally, and thus reads out pixel data at different instants of time. In other words, not all parts of the image of the scene are recorded at exactly the same instant. Thus, by the term "pixel region" should, in the context of present specification, be understood for example a row of pixels or a column of pixels of the rolling shutter image sensor. A pixel region may also comprise a plurality of rows or columns of the rolling shutter image sensor. During such read out of pixel data, a camera motion of the camera is continuously measured. The camera motion may for example be measured for each pixel region of the rolling shutter image sensor or be measured for every other pixel region etc. However, the camera motion will be measured on at least two occasions during the read out of pixel data from the plurality of pixel regions such that one pixel region may be associated with a motion data (indicating the measured camera motion level) different from a motion data associated with another pixel region. For pixel regions in between these two pixel regions, the camera motion may be interpolated from the two measures.

Below, the rolling shutter image sensor may be referred to as an image sensor, for simplicity.

The camera motion for a pixel region is herein represented by a data defining a pose of the image sensor at the time when the pixel data is read out from a pixel region. Herein, the pose of the image sensor indicates an orientation (e.g. pitch, yaw and/or roll) and/or position (e.g. x, y and/or z-position of the image sensor). The pose may thus be represented in 1 degree of freedom (DOF) to 6 DOF.

The first and second motion data thus comprises at least two measured poses of the image sensor during the capture of the first and second image. Each measured pose corresponds to a pixel region as defined above. Any remaining poses not explicitly present in the motion data is still indicated and may be calculated through any known interpolation strategy.

The first and the second image is advantageously captured close in time, e.g. in two subsequent time periods, or interleaved in time using e.g. the DOL-HDR technology. In any case, the first image, i.e. all image data of the first image, is e.g. captured with a short exposure time, and the second image, i.e. all image data of the second image, is e.g. captured with a longer exposure time, or vice versa.

It should be understood that more than two (>2) images may be captured (with different exposure times) to create the HDR image. For simplicity, the disclosure only describes the two-image case.

By merging the first and second images, an HDR image is created. There are many known multi exposure techniques for creating an HDR image, known to the skilled reader. Typically, merging is based on threshold values, to reduce the number of pixels in the HDR image being over-exposed (i.e. full-well capacity of the image sensor). Linear weighting may be used when merging the plurality of exposures. Tone-mapping of the result of the merger may also be employed, depending on the use-case.

After the merging step, EIS is performed on the HDR image.

The inventors have realized that performing EIS by only optimizing for one of the exposures (e.g. the one with the longer exposure time) when calculating a correction table for the EIS, any part of the final HDR image (the stabilized HDR image) that comes from the long exposure will look correct, but the highlights (coming from the short exposure) will flicker around as if disconnected from the underlying scene. To mitigate for this, the EIS is performed on a block of pixels (e.g. a macroblock) basis by determining which image the block is copied from and calculating the spatial correction for that block by using the corresponding first or second motion data to determine the spatial correction for that block in the final HDR. Advantageously, it is then possible to stabilize the final HDR on a block basis based on the corresponding pose of the rolling shutter image sensor when capturing that block of pixels. This may in turn improve the perceived quality of the final HDR image.

According to some embodiments, upon determining that the specific block of pixels is a blend of pixel data from both the first image and the second image, the method further comprises:

receiving a first blending value indicating a ratio of pixel data from the first image in the specific block of pixels, calculating a pose for the specific block of pixels by weighting the pose of the corresponding pixel region of the first motion data and the pose of the corresponding pixel region of the second motion data according the first blending value, wherein EIS is performed on the specific block of pixels by using the calculated pose.

In other words, the pose of the corresponding pixel region of the first motion data and the pose of the corresponding pixel region of the second motion data are mixed as a linear combination with weights that sum to unity, wherein the weights depend on the first blending value. The calculated mixed pose is then used for EIS.

The blending (and thus the ratio) between the pixel data from the first and second images may be determined according to the HDR algorithm used. Typically, the blending is determined based on how close to over-exposure a block of pixels of the image with the longer exposure is. Alternatively, or additionally, the blending is determined based on how close to under-exposure a corresponding block of pixels of the image with the shorter exposure is.

In this embodiment, for blocks of pixels that are blended, a weighted result from motion data collected for both the long and short exposures is used. Consequently, EIS for these blocks of pixels may be perceived as correctly performed, i.e. coherent with EIS for the blocks of pixels taken from either the first or second image.

According to some embodiments, the method further comprises, upon determining that the specific block of pixels is a blend of pixel data from both the first image and the second image, the method further comprises:

receiving a second blending value indicating a ratio of blocks of pixels adjacent to the specific block of pixels that is copied from pixel data of the first image, calculating a pose for the block of pixels by weighting the pose of the corresponding pixel region of the first motion data and the pose of the corresponding pixel region of the second motion data according the second blending value, wherein EIS is performed on the specific block of pixels by using the calculated pose.

In other words, the pose of the corresponding pixel region of the first motion data and the pose of the corresponding pixel region of the second motion data are mixed as a linear combination with weights that sum to unity, wherein the weights depend on the ratio of blocks of pixels adjacent to the specific block of pixels that is copied from pixel data of the first image. The calculated mixed pose are then used for EIS.

In this embodiment, the ratio the number of surrounding blocks of pixels that are copied from the first image compared to the number of surrounding blocks of pixels that are copied from the second image are used for weighting the data from the first and second motion data. Consequently, EIS for these blocks of pixels may be perceived as correctly performed, i.e. coherent with EIS for the surrounding blocks of pixels (taken from either the first or second image).

According to some embodiments, each pose in the first motion data comprises angular orientation data indicating a yaw, a pitch and optionally a roll of the rolling shutter image sensor when reading out pixel data from the corresponding pixel region when capturing the first image, wherein each pose in the second motion data comprises angular orientation data indicating a yaw, a pitch and optionally a roll of the rolling shutter image sensor when reading out pixel data from the corresponding pixel region when capturing the second image.

For a camera mounted to e.g. a wall, this embodiment may be sufficient to achieve a perceived high quality EIS of the HDR image. Most cameras already comprise sensors for measuring angular orientation, and the present embodiment may thus not incur any additional hardware cost.

Additionally, or alternatively, according to some embodiments, each pose in the first motion data comprises position data indicating to a position in space of the rolling shutter image sensor when reading out pixel data from the corresponding pixel region when capturing the first image, wherein each pose in the second motion data comprises position data indicating to a position in space of the rolling shutter image sensor when reading out pixel data from the corresponding pixel region when capturing the second image.

For movable cameras, such as body worn cameras (BWC), On-Dash Mounted Cameras, etc., advantageously, the position of the camera (and thus the rolling shutter image sensor) is taken into account when performing EIS. The position may be indicated by at least one of a x-value, y-value and z-value of the camera.

According to a second aspect, there is provided a non-transitory computer-readable storage medium having stored thereon instructions for implementing the method according to the first aspect when executed on a device having processing capabilities.

The second aspect may generally have the same features and advantages as the first aspect.

According to a third aspect, there is provided a device configure to perform electronic image stabilization, EIS, of a high dynamic range, HDR, image, depicting a scene, the device comprises first circuitry configured to execute:

an image receiving function configured to receive a first image and a second image depicting the scene, the first and second image captured by a rolling shutter image sensor comprising a plurality of pixel regions, wherein the rolling shutter image sensor during capture of an image reads out pixel data from one pixel region at a time, the first and second image captured with different exposure times, a motion data receiving function configured to receive first and second motion data, each indicating a plurality of poses of the rolling shutter image sensor when capturing the first and second image, respectively, wherein each pose corresponding to a pixel region of the rolling shutter image sensor and indicates an orientation and/or position of the rolling shutter image sensor determined during read-out of pixel data of the pixel region, an HDR image creation function configured to create the HDR image by merging the first and second images, an EIS performing function configured to perform EIS on the HDR image, by, for each specific block of pixels among the blocks of pixels in the HDR image, the specific block of pixels spatially corresponding to a pixel region of the rolling shutter image sensor:

determining whether the specific block of pixels is copied from pixel data of the first image or the second image, or is a blend of pixel data from both the first image and the second image, wherein, upon determining that the specific block of pixels is copied from pixel data of the first image, EIS is performed on the specific block of pixels by using the pose of the corresponding pixel region of the first motion data, wherein, upon determining that the specific block of pixels is copied from pixel data of the second image, EIS is performed on the specific block of pixels by using the pose of the corresponding pixel region of the second motion data.

The third aspect may generally have the same features and advantages as the first aspect.

According to a fourth aspect, there is provided camera comprising:

a device according to the third aspect, a rolling shutter image sensor comprising a plurality of pixel regions, wherein the rolling shutter image sensor during capture of an image reads out pixel data from one pixel region at a time, wherein the rolling shutter image sensor is configured to capture a first and a second image with different exposure times, second circuitry configured to execute:

an image transmission function configured to transmit said first and second image to the device.

According to some embodiments, the camera further comprises a motion sensor configured to determine first and second motion data, each indicating a plurality of poses of the rolling shutter image sensor when capturing the first and second image, respectively, wherein the motion sensor is configured to determine an orientation and/or position of the rolling shutter image sensor during read-out of pixel data of a pixel region of the plurality of pixel regions of the rolling shutter image sensor, and store the pose in the respective motion data, wherein the second circuitry is configured to execute:

a motion data transmission function configured to transmit said first and second motion data to the device.

According to some embodiments, the motion sensor comprises a gyroscope to determine an orientation of the rolling shutter image sensor.

According to some embodiments, the motion sensor comprises an accelerometer to determine a position in space of the rolling shutter image sensor.

According to some embodiments, the rolling shutter image sensor comprises a first rolling shutter image sensor for capturing the first image, and a second rolling shutter image sensor for capturing the second image.

According to some embodiments, the rolling shutter image sensor comprises a single rolling shutter image sensor, where said single rolling shutter image sensor first captures the entire first image and then captures the entire second image.

According to some embodiments, the rolling shutter image sensor comprises a single rolling shutter image sensor, wherein said single rolling shutter image sensor, from a first pixel region of the plurality of pixel regions, reads out image data for both the first and second image before continuing to read out image data from a second, different, pixel region of the plurality of pixel regions.

The fourth aspect may generally have the same features and advantages as the first aspect.

BRIEF DESCRIPTION OF THE DRAWINGS

The above, as well as additional objects, features and advantages will be better understood through the following illustrative and non-limiting detailed description of embodiments, with reference to the appended drawings, where the same reference numerals will be used for similar elements, wherein.

DETAILED DESCRIPTION OF EMBODIMENTS

Figure 1:
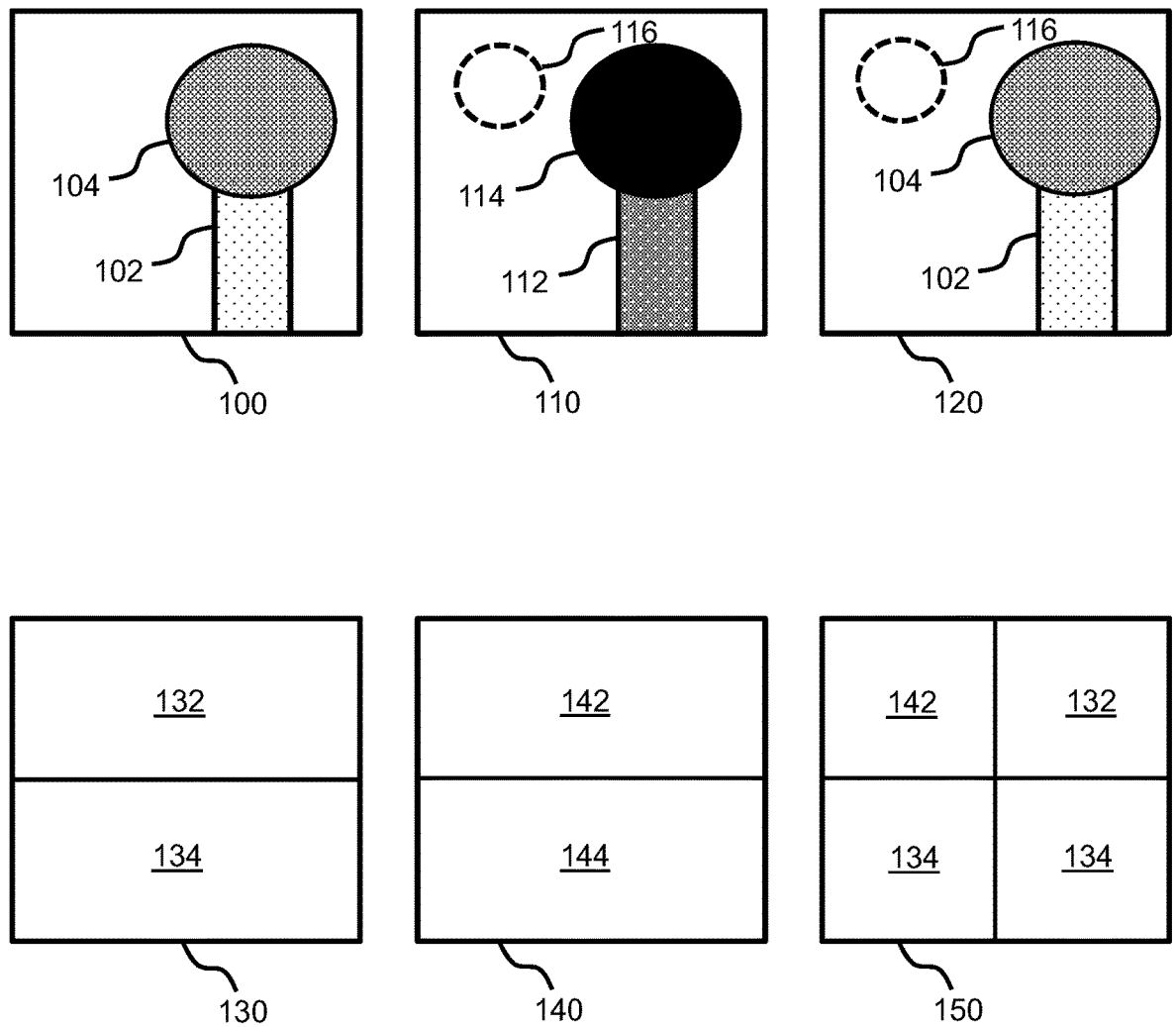
FIG. 1 schematically shows data used for performing EIS of an HRD image according to an embodiment, FIG. 2 schematically shows data used for performing EIS of an HRD image according to another embodiment.

In a camera with rolling shutter image sensor, since the lines (rows or columns) of pixels are read at slightly different time, some of the readouts may be affected by vibrations (felt by e.g. a gyro or accelerometer) and some not. Moreover, the magnitude of vibrations may differ between the readouts. Also, the rolling shutter image may move for other reasons than vibrations during capturing of an image.

Accordingly, a pose of the rolling shutter image sensor may change while capturing an image and differ between readouts of lines of pixels.

Moreover, to create an HDR image, at least two images with different exposure times are needed. These images will be captured during different time spans, either subsequent time spans or overlapping time spans. In any case, a line of pixels in a first image (e.g. the one captured with a short exposure time) may be affected by a vibration different from a corresponding line of pixels in a second image (e.g. the one captured with a longer exposure time). Similarly, the rolling shutter image may move differently for other reasons than vibrations during capturing of the first and second image.

Accordingly, a pose of the rolling shutter image sensor may change while capturing a plurality of images and differ between readouts of lines of pixels in the first and second image.

This may cause a problem when EIS of the HDR image is to be performed, in particular when EIS is performed after the HDR image is created by merging the at least first and second images. This disclosure may facilitate an improved EIS in such a case.

As described herein, an HDR image may be created using any known algorithm. Scenes that contain both very dark and very bright areas are challenging for a camera. Typical examples of such wide dynamic range (WDR) scenes in security include entrance doors, parking garages, and tunnels, where there is a large contrast between the light from outside and the darker interior. Outdoor scenes with direct sunlight and deep shadows are also problematic. Several methods have been developed for cameras to be able to better recreate the full scene content. No single technique is optimal for all scenes and situations, and every method has its drawbacks, including the introduction of various visual anomalies referred to as artifacts. There are both multiple exposure methods and single exposure methods. Local contrast enhancement methods may further be used. In this disclosure, the HDR image is created using multiple exposure methods.

In the below detailed examples, an HDR image is created from a first and a second image captured with different exposure times. As explained above, further images (having yet other exposure times) may also be used to create the HDR. For simplicity, this disclosure focuses on the two-image case, where the first image is captured with a longer exposure compared to the second image. However, the disclosure may easily be adapted to an X-image case, where X>2.

Generally, it is preferred if the HDR image is created mostly from the long exposure image with a lesser amount of data originating from the short exposure image. In the HDR image, data from the long exposure image generally has less noise. Let's say that the long exposure image is captured by an exposure time of 0.01 seconds, and the short exposure image is captured by an exposure time of 0.001 seconds. This means that a pixel in the long exposure image is around 10 times brighter than a pixel in the short exposure image. Consequently, pixel data from the short exposure image needs to be intensified (enhanced, multiplied, etc.) 10 times when being added to the HDR image. This in turn leads to an increased noise in the data from the short exposure image as well.

Advantageously, the exposure time of the long exposure image is thus adapted based on the brightness of the captured scene. The exposure time of the short exposure image may also be adapted based on the brightness of the captured scene or be a predefined fraction of the long exposure time. In other embodiments, the exposure times of the short and long exposure image are predefined.

Figure 3:
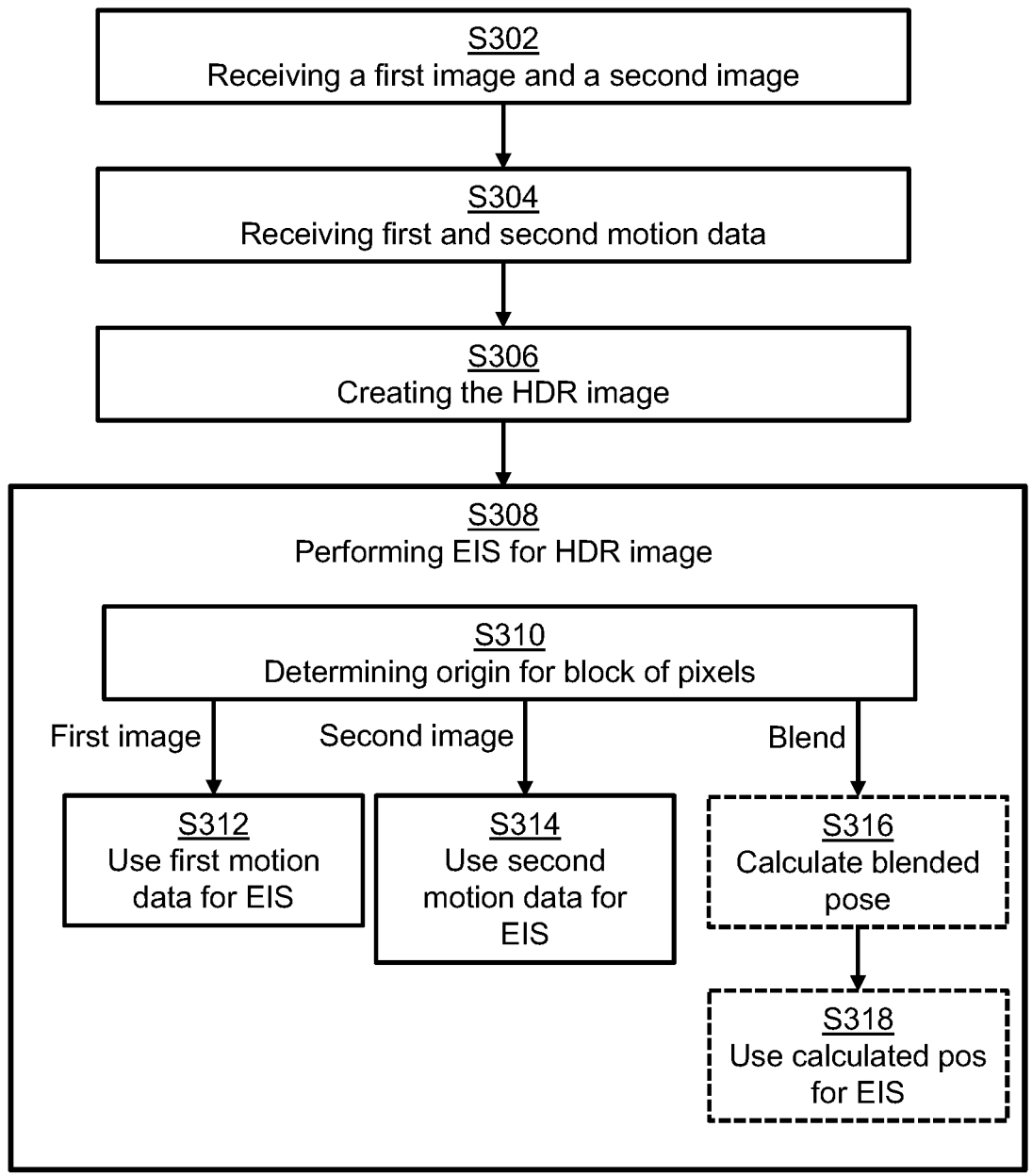
FIG. 3 shows a flowchart of a method for performing EIS of an HRD image, FIG. 4 schematically shows a camera comprising circuitry for performing EIS of an HDR image, FIG. 5 schematically shows weights for the motion data in the embodiment where a ratio of surrounding image data copied from the first image is used for determining a weight for a block of pixels.

A method of performing EIS of a high dynamic range, HDR, image, depicting a scene will now be described in conjunction with FIGS. 1 and 3.

The upper part of FIG. 1 shows three images 100, 110, 120 of a scene, schematically depicting an outdoor scene with direct sunlight and deep shadows. The left most, first, image 100 represents an image captured with a longer exposure range compared to the middle, second, image 110. As schematically indicated in second image, an area 114 is underexposed, while an area 116 is captured only in the second image 120 as it is overexposed in the first image 100. The first 100 and second 110 image is received S302 by a device (further described below in conjunction with FIG. 4) which is configured to perform electronic image stabilization, EIS, of a high dynamic range, HDR, image.

The rightmost image 120 represents the HDR image created S306 (by merger) from the first 100 and second 110 image. In the HDR image 120, the area 116 is copied from the second image 110, and the remaining areas 102, 104 are copied from the first image 100.

The first 100 and second 110 images are captured by a a rolling shutter image sensor as further defined below.

The lower part of FIG. 1 represents first 130 and second 140 motion data, each indicating a plurality of poses of the rolling shutter image sensor when capturing the first 100 and second 110 image. In this simplified example, the rolling shutter image comprises two pixel regions, such that the motion data comprises two poses, one for the upper part of the image, and one for the lower part of the image. Consequently, the motion data 130 indicates two poses 132, 134. The pose 132 corresponds to the upper pixel region of the rolling shutter image sensor and indicates an orientation and/or position of the rolling shutter image sensor determined during read-out of pixel data of the upper pixel region for the first image 100. Correspondingly, the pose 134 indicates the orientation and/or position of the rolling shutter image sensor when reading out pixel data for the lower pixel region of the first image 100. The same goes for the second motion data 140 which indicates two poses 142, 144 which corresponds to the upper and lower pixel regions of the second image 110.

The poses of the first 130 and the second 140 motion data may comprise angular orientation data indicating a yaw, a pitch and optionally a roll of the rolling shutter image sensor when reading out pixel data from the corresponding pixel region when capturing the first/second image 100, 110. Alternative or additionally, the poses of the first 130 and the second 140 motion data may comprise position data indicating to a position in space of the rolling shutter image sensor when reading out pixel data from the corresponding pixel region when capturing the first/second image 100, 110. The position may be indicated by at least one of a x-value, y-value and z-value of the rolling shutter image sensor.

The first 130 and second 140 motion data is also received S304 and used for performing EIS on the HDR image 120 as now will be described.

To perform EIS, for each block of pixels in the HDR image 120, it is determined which pose from the first 130 and/or second 140 motion data that should be used.

A block of pixels as described herein may correspond to a macroblock of the HDR image. Any other suitable way of dividing the pixels of the HDR image 120 into blocks of pixels for performing the EIS may be employed. Typically, a block of pixels has the size of 8×8, 16×16, 32×32 or 64×64 pixels. The size of the blocks of pixels may be the same over the entire HDR image 120, or vary across the HDR image 120.

For ease of description, in the example of FIG. 1, the HDR image 120 is divided into 4 blocks of pixels, each of which spatially corresponding to a pixel region of the rolling shutter image sensor (i.e. two blocks for the upper region, and two blocks for the lower region. These blocks of pixels are represented in FIG. 1 by the table 150, where the pose used for each block of pixels are marked using a reference number taken from the first 130 or second 140 motion data.

For each block of pixels, it is determined S310 whether the block of pixels is copied from pixel data of the first image or the second image, or is a blend of pixel data from both the first image and the second image. In the example of FIG. 1, the HDR image 120 does not contain any blended region (this embodiment will be described in conjunction with FIG. 2 below).

For the upper left block of pixels in the HDR image 120, it is determined that the block of pixels is copied from pixel data of the second image 110. Consequently, for that block of pixels, EIS is performed S312 by using the pose 142 of the corresponding pixel region of the second motion data 140.

For the remaining blocks of pixels in the HDR image 120, it is determined that these blocks of pixels are copied from pixel data of the first image 100. Consequently, for these blocks of pixels, EIS is performed S312 by using the pose 132, 134 of the corresponding pixel region of the first motion data 140.

Figure 2:
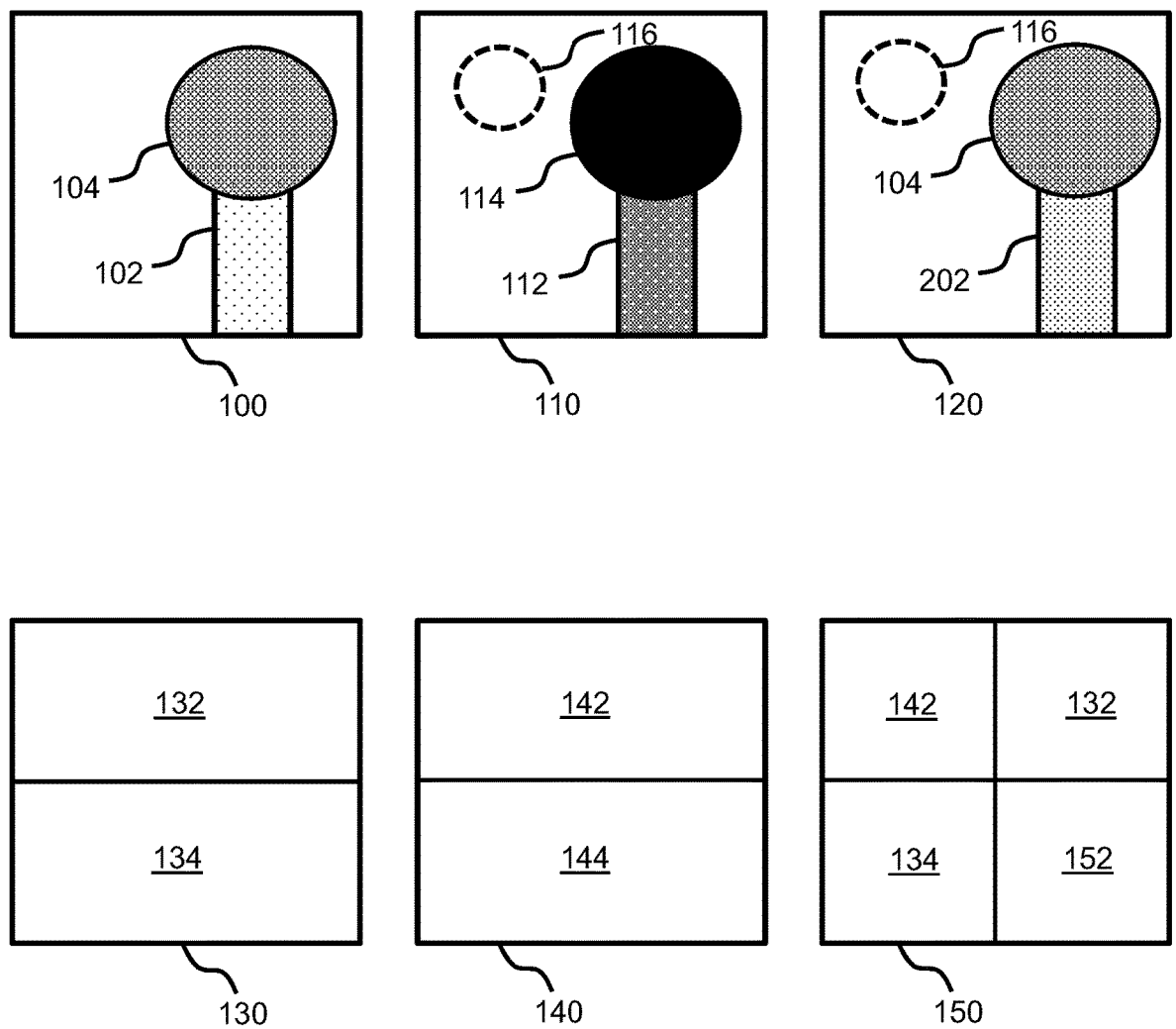

FIG. 2 shows the same two images 100, 110 as FIG. 1, and having the same motion data 130, 140. However, the resulting HDR image 120 comprises a blended area 202, where image data from the area 102 in the first image 100 and image data from the area 112 in the second image 110 are blended to form the image data of the blended area 202 in the HDR image. How the blending is performed depends on the HDR algorithm that is used. Typically, a certain percentage of the image data from the long exposure image is mixed with a certain percentage of the image data from the short exposure image, where the percentage used depends on how close to over-exposure a block of pixels of the image with the longer exposure is, and/or how close to under-exposure a corresponding block of pixels of the image with the shorter exposure is.

In this embodiment, upon determining that the specific block of pixels is a blend of pixel data from both the first image and the second image, the pose 152 to be used may be calculated S316 by weighting the pose 134 of the corresponding pixel region of the first motion data 130 and the pose 144 of the corresponding pixel region of the second motion data 140. The weighting may be done in a plurality of ways. In one embodiment, the weighting depends on how much of the image data in the blended region originates from the first image 100 (or vice versa). In this embodiment, a first blending value is received indicating a ratio of pixel data from the first image 100 in the blended block of pixels. For example, the value indicates that 60% of the pixel data is from the first image 100. Consequently, in this embodiment, the blended pose 152 would be calculated as X*134+(1−X)***144, where X=0.6. The blended pose 152 is then used S318 for performing EIS on the blended pixel area 202 in the HDR image 120.

Figures 4, 5:
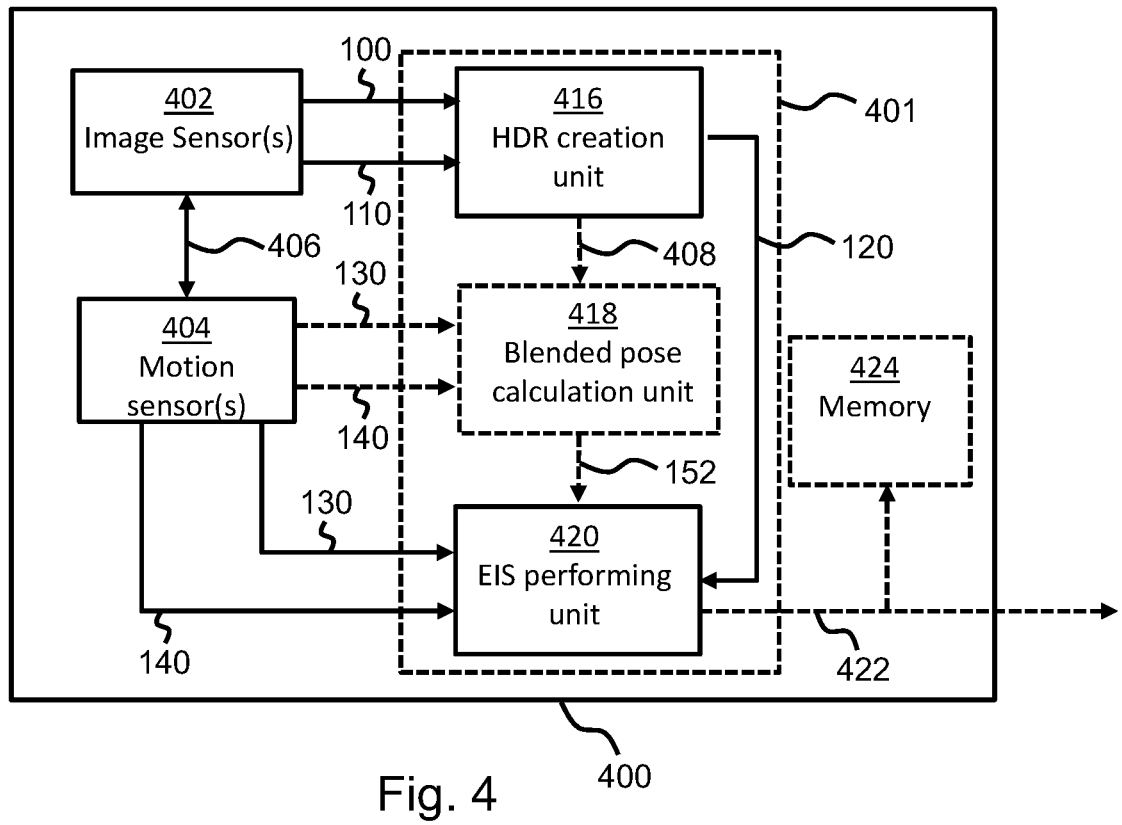

Another embodiment is shown in FIG. 5. In FIG. 5, the HDR image is represented by a table 500. Each cell in the table 500 represents a block of pixels in the HDR image. The cell value $T_0$ represents that this block of pixels is copied from the first image. The cell value $T_1$ represents that this block of pixels is copied from the second image. As can be seen in FIG. 5, two blocks of pixels are copied from the second image, and nine blocks of pixels are copied from the first image. The remaining blocks comprises a blend of pixel data from both the first image and the second image. In this embodiment, for each of the blended block of pixels, a second blending value indicating a ratio of blocks of pixels adjacent to the specific block of pixels that is copied from pixel data of the first image is used to determine how to poses from the corresponding pixel region of the first motion data and the pose of the corresponding pixel region of the second motion data is weighted. In the schematic example of FIG. 5, for the two blocks of pixels in the middle of the second row, the second blending value is calculated to 70% represented by the cell value $T_{0.3}$. Consequently, in this embodiment, the blended pose for that block of pixels would be calculated as X*(value of the first motion data)+(1−X)* (value of the second motion data), where X=0.7. The blended pose is then used S318 for performing EIS on the blended pixel area in the HDR image.

For other blended blocks of pixels, other blending values are calculated and represented by cell value $T_{0.5}$, and $T_{0.7}$.

FIG. 4 shows by way of example a device 401 configure to perform electronic image stabilization, EIS, of a high dynamic range, HDR, image, depicting a scene. In this example, the device 401 is included in a camera 400 also comprising one or more image sensors 402 and one or more motion sensors 404. In other embodiments, the device 401 is separate from the camera 400 and receiving (through wired or wireless communication) required data for performing EIS of the HDR image.

The device 401 comprises circuitry configured to execute the method exemplified above in conjunction with FIGS. 1-3 and 5.

The circuitry may be embodied by one or more processors, or as an application-specific integrated circuit. It should be noted that the methods disclosed hereinabove may be implemented as software, firmware, hardware or a combination thereof.

For example, the methods described above may be implemented in software stored on a non-transitory computer-readable storage medium, i.e. having stored thereon instructions for implementing the method according to the above when executed on a device (e.g. by the circuitry of device 401) having processing capabilities.

Returning now to FIG. 4, the circuitry of the device 401 may be configured to execute an image receiving function configured to receive a first image 100 and a second image 110. The circuitry may further be configured to execute an HDR image creation function configured to create the HDR image by merging the first and second images, 100, 110. In FIG. 4, the image receiving function and the HDR image creation function is embodied by an HDR creation unit 416. It should be noted that division of tasks between functional units referred to in this disclosure does not necessarily correspond to the division into physical units; to the contrary, one physical component may have multiple functionalities, and one task may be carried out by several physical components in cooperation.

The circuitry may of the device 401 may further be configured to execute a motion data receiving function configured to receive first 130 and second 140 motion data. In FIG. 4, such motion data receiving function is implemented at least in the EIS performing unit 420. The EIS performing unit 420 further implements an EIS performing function configured to perform EIS on the HDR image 120 received from the HDR creation unit 416. The EIS performing function is configured to perform EIS on the HDR image 120 as described above.

The EIS HDR image 422 may then be outputted from the device 401, for example transferred to a device remote from the camera 400 or stored in memory 424 of the camera (or a memory outside of the camera).

In some embodiments, e.g. as described in FIG. 2, also blended image data from the first and second image 100, 110 in the HDR image 120 is possible. For that reason, the device 401 may comprise functionality for calculating a blended pose to be used for EIS of blocks of pixels in the HDR image 120 that comprises blended image data. In FIG. 4, such functionality is implemented in a blended pose calculation unit 418. The blended pose calculation unit 418 receives information 408 from the HDR creation unit 416 which blocks of pixels that comprises blended image data, and how such blended pixel data is blended from the first and second image data 100, 110. The blended pose calculation unit 418 further receives the first and second motion data 130, 140 and calculates the blended pose 152 e.g. as described above. The blended pose 152 is sent to the EIS performing unit 420 to be utilized accordingly.

The camera 400 further comprises at least one rolling shutter image sensor 402 comprising a plurality of pixel regions. Each rolling shutter image sensor 402 reads out pixel data from one pixel region at a time during capture of an image. The at least one rolling shutter image sensor 402 is configured to capture a first 100 and a second 110 image with different exposure times.

In one embodiment, a first rolling shutter image sensor 402 is used for capturing the first image 100, and a second rolling shutter image sensor 402 is used for capturing the second image 110. In this case, the first and second sensor 402 may capture the respective images 100, 110 subsequent to each other, or during overlapping time intervals. A more flexible solution for capturing the images 100, 110 for the HDR image may thus be achieved.

In another embodiment, the rolling shutter image sensor 402 comprises a single rolling shutter image sensor 402, where said single rolling shutter image sensor first captures the entire first image 100 and then captures the entire second image 110. Consequently, a low complexity solution for capturing the images 100, 110 for the HDR image may thus be achieved. Furthermore, a cost of the camera 400 may be lowered.

In yet another embodiment, DOL-HDR technology is employed. In this embodiment, the rolling shutter image sensor 402 comprises a single rolling shutter image sensor 402, wherein said single rolling shutter image sensor 402, from a first pixel region of the plurality of pixel regions, reads out image data for both the first 100 and second 110 image before continuing to read out image data from a second, different, pixel region of the plurality of pixel regions. This embodiment may provide advantages such as improved characteristics in low-light environments compared to conventional WDR/HDR technology that uses multiple image set output.

The captured images 100, 110 are transmitted to the device 401 using second circuitry configured to execute an image transmission function configured to transmit said first and second image to the device 401. The first and second circuitry may be separate circuitry or same circuitry, e.g. embodied by one or more processors or similar. In the embodiment of FIG. 4, the first and second images 100, 110 are received by the HDR creation unit 416 of the device 401.

For measuring a pose of the at least one rolling shutter image sensor 402 during capturing of the first and second images 100, 110, the camera 400 may be provided with at least one motion sensor 404 configured to determine first 130 and second 140 motion data. As described above, each motion data 130, 140 indicates a plurality of poses of the rolling shutter image sensor 402 when capturing the first and second image, respectively, wherein the motion sensor 404 is configured to determine an orientation and/or position of the rolling shutter image sensor during read-out of pixel data of a pixel region of the plurality of pixel regions of the rolling shutter image sensor. The determined poses are stored in the respective motion data 130, 140.

The at least one motion sensor 404 may comprise an accelerometer to determine a position in space of the rolling shutter image sensor. The accelerometer may also be used for determining an orientation of the rolling shutter image sensor, by estimating a vector for the acceleration of gravity from the accelerometer, and comparing this vector to what the vector would be if the accelerometer was in its "normal orientation" (e.g. in a predefined orientation). Alternatively, or additionally, the at least one motion sensor 404 comprises a gyroscope to determine an orientation of the rolling shutter image sensor. Other suitable motion sensors for measuring the pose of the rolling shutter image sensor 402 may be used.

As an alternative to using sensors for determining the motion data 130, 140, an image analysis algorithm may be used to determine motion of the rolling shutter image sensor during capturing of the first and second images 100, 110.

Each pose may thus represent the position and/or rotation of the rolling shutter image sensor 402, where the position and/or rotation may be represented by one degree of freedom to six degrees of freedom in space.

The motion data 130, 140 are transmitted to the device 401 using second circuitry configured to execute a motion data transmission function configured to transmit said first and second motion data to the device. In the embodiment of FIG. 4, the first and second motion data 130, 140 are received by the EIS performing unit 420 of the device 401. Optionally, the first and second motion data 130, 140 are also received by the blended pose calculation unit 418 of the device 401.

It should be noted that the architecture of the camera 400 and the device 401 shown in FIG. 4 is only by way of example and that any suitable architecture for a device configured to perform the method of performing EIS of an HDR image as described herein may be employed.

The invention claimed is:

1. A method of performing electronic image stabilization (EIS) of a high dynamic range (HDR) image, depicting a scene, the method comprising:
   receiving a first image and a second image depicting the scene, the first and second image captured by a rolling shutter image sensor comprising a plurality of pixel regions, wherein the rolling shutter image sensor during capture of an image reads out pixel data from one pixel region at a time, the first and second image captured with different exposure times,
   receiving first and second motion data, each indicating a plurality of poses of the rolling shutter image sensor when capturing the first and second image, respectively, wherein each pose corresponds to a pixel region of the rolling shutter image sensor and indicates an orientation and/or position of the rolling shutter image sensor determined during read-out of pixel data of the pixel region, creating the HDR image by merging the first and second images, performing EIS on the HDR image, by, for each specific block of pixels among the blocks of pixels in the HDR image, the specific block of pixels spatially corresponding to a pixel region of the rolling shutter image sensor:

determining whether the specific block of pixels is copied from pixel data of the first image or the second image, or is a blend of pixel data from both the first image and the second image, wherein, upon determining that the specific block of pixels is copied from pixel data of the first image, EIS is performed on the specific block of pixels by using the pose of the corresponding pixel region of the first motion data, wherein, upon determining that the specific block of pixels is copied from pixel data of the second image, EIS is performed on the specific block of pixels by using the pose of the corresponding pixel region of the second motion data, wherein, upon determining that the specific block of pixels is a blend of pixel data from both the first image and the second image, the method further comprises:

receiving a first blending value indicating a ratio of pixel data from the first image in the specific block of pixels or a second blending value indicating a ratio of blocks of pixels adjacent to the specific block of pixels that is copied from pixel data of the first image, calculating a pose for the specific block of pixels by weighting the pose of the corresponding pixel region of the first motion data and the pose of the corresponding pixel region of the second motion data according the first blending value, wherein EIS is performed on the specific block of pixels by using the calculated pose.

2. The method of claim 1, wherein each pose in the first motion data comprises angular orientation data indicating a yaw, a pitch and optionally a roll of the rolling shutter image sensor when reading out pixel data from the corresponding pixel region when capturing the first image, wherein each pose in the second motion data comprises angular orientation data indicating a yaw, a pitch and optionally a roll of the rolling shutter image sensor when reading out pixel data from the corresponding pixel region when capturing the second image.

3. The method of claim 1, wherein each pose in the first motion data comprises position data indicating to a position in space of the rolling shutter image sensor when reading out pixel data from the corresponding pixel region when capturing the first image, wherein each pose in the second motion data comprises position data indicating to a position in space of the rolling shutter image sensor when reading out pixel data from the corresponding pixel region when capturing the second image.

4. A non-transitory computer-readable storage medium having stored thereon instructions for implementing the method according to claim 1 when executed on a device having processing capabilities.

5. A device configured to perform electronic image stabilization (EIS) of a high dynamic range (HDR) image, depicting a scene, the device comprises first circuitry configured to execute:

an image receiving function configured to receive a first image and a second image depicting the scene, the first and second image captured by a rolling shutter image sensor comprising a plurality of pixel regions, wherein the rolling shutter image sensor during capture of an image reads out pixel data from one pixel region at a time, the first and second image captured with different exposure times, a motion data receiving function configured to receive first and second motion data, each indicating a plurality of poses of the rolling shutter image sensor when capturing the first and second image, respectively, wherein each pose corresponds to a pixel region of the rolling shutter image sensor and indicates an orientation and/or position of the rolling shutter image sensor determined during read-out of pixel data of the pixel region, an HDR image creation function configured to create the HDR image by merging the first and second images, an EIS performing function configured to perform EIS on the HDR image, by, for each specific block of pixels among the blocks of pixels in the HDR image, the specific block of pixels spatially corresponding to a pixel region of the rolling shutter image sensor:

determining whether the specific block of pixels is copied from pixel data of the first image or the second image, or is a blend of pixel data from both the first image and the second image, wherein, upon determining that the specific block of pixels is copied from pixel data of the first image, EIS is performed on the specific block of pixels by using the pose of the corresponding pixel region of the first motion data, wherein, upon determining that the specific block of pixels is copied from pixel data of the second image, EIS is performed on the specific block of pixels by using the pose of the corresponding pixel region of the second motion data, wherein, upon determining that the specific block of pixels is a blend of pixel data from both the first image and the second image, a blended pose calculation function is configured to:

receive a first blending value indicating a ratio of pixel data from the first image in the specific block of pixels or a second blending value indicating a ratio of blocks of pixels adjacent to the specific block of pixels that is copied from pixel data of the first image, and calculate a pose for the specific block of pixels by weighting the pose the corresponding pixel region of the first motion data and the pose of the corresponding pixel region of the second motion data according the first blending value, wherein EIS is performed on the specific block of pixels by using the calculated pose.

6. A camera comprising:

a rolling shutter image sensor comprising a plurality of pixel regions, wherein the rolling shutter image sensor during capture of an image reads out pixel data from one pixel region at a time, wherein the rolling shutter image sensor is configured to capture a first and a second image, depicting a scene, with different exposure times, and second circuitry configured to transmit the first and the second image to a device,
the device configured to perform electronic image stabilization (EIS) of a high dynamic range (HDR) image, the device comprises first circuitry configured to execute:
an image receiving function configured to receive the first image and the second image,
a motion data receiving function configured to receive first and second motion data, each indicating a plurality of poses of the rolling shutter image sensor when capturing the first and second image, respectively, wherein each pose corresponds to a pixel region of the rolling shutter image sensor and indicates an orientation and/or position of the rolling shutter image sensor determined during read-out of pixel data of the pixel region,
an HDR image creation function configured to create the HDR image by merging the first and second images,
an EIS performing function configured to perform EIS on the HDR image, by, for each specific block of pixels among the blocks of pixels in the HDR image, the specific block of pixels spatially corresponding to a pixel region of the rolling shutter image sensor:
determining whether the specific block of pixels is copied from pixel data of the first image or the second image, or is a blend of pixel data from both the first image and the second image,
wherein, upon determining that the specific block of pixels is copied from pixel data of the first image, EIS is performed on the specific block of pixels by using the pose of the corresponding pixel region of the first motion data,
wherein, upon determining that the specific block of pixels is copied from pixel data of the second image, EIS is performed on the specific block of pixels by using the pose of the corresponding pixel region of the second motion data,
wherein, upon determining that the specific block of pixels is a blend of pixel data from both the first image and the second image, a blended pose calculation function is configured to:
receive a first blending value indicating a ratio of pixel data from the first image in the specific block of pixels or a second blending value indicating a ratio of blocks of pixels adjacent to the specific block of pixels that is copied from pixel data of the first image, and
calculate a pose for the specific block of pixels by weighting the pose the corresponding pixel region of the first motion data and the pose of the corresponding pixel region of the second motion data according the first blending value,
wherein EIS is performed on the specific block of pixels by using the calculated pose.

7. The camera of claim 6, further comprising a motion sensor configured to determine first and second motion data, each indicating a plurality of poses of the rolling shutter image sensor when capturing the first and second image, respectively, wherein the motion sensor is configured to determine an orientation and/or position of the rolling shutter image sensor during read-out of pixel data of a pixel region of the plurality of pixel regions of the rolling shutter image sensor, and store the pose in the respective motion data,
wherein the second circuitry is configured to execute: a motion data transmission function configured to transmit said first and second motion data to the device.

8. The camera of claim 7, wherein the motion sensor comprises a gyroscope to determine an orientation of the rolling shutter image sensor.

9. The camera of claim 6, wherein the motion sensor comprises an accelerometer to determine a position in space of the rolling shutter image sensor.

10. The camera of claim 6, wherein the rolling shutter image sensor comprises a first rolling shutter image sensor for capturing the first image, and a second rolling shutter image sensor for capturing the second image.

11. The camera of claim 6, wherein the rolling shutter image sensor comprises a single rolling shutter image sensor, where said single rolling shutter image sensor first captures the entire first image and then captures the entire second image.

12. The camera of claim 6, wherein the rolling shutter image sensor comprises a single rolling shutter image sensor, wherein said single rolling shutter image sensor, from a first pixel region of the plurality of pixel regions, reads out image data for both the first and second image before continuing to read out image data from a second, different, pixel region of the plurality of pixel regions.

* * * * *